United States Patent
Jang et al.

(10) Patent No.: US 6,613,301 B2
(45) Date of Patent: Sep. 2, 2003

(54) METHOD FOR PRODUCING NANOMETER-SIZED ULTRAFINE TITANIUM DIOXIDE

(75) Inventors: Hee-Dong Jang, Daejeon (KR); Seong-Kil Kim, Anyang-si (KR)

(73) Assignees: Korea Institute of Geosciencie and Mineral Resources, Daejeon (KR); Samhwa Paints Industrial Co., Ltd., Gyeonggi-do (KR)

(*) Notice: Subject to any disclaimer, the term of this patent is extended or adjusted under 35 U.S.C. 154(b) by 249 days.

(21) Appl. No.: 09/828,282

(22) Filed: Apr. 5, 2001

(65) Prior Publication Data

US 2002/0004029 A1 Jan. 10, 2002

(30) Foreign Application Priority Data

Apr. 7, 2000 (KR) ......................................... 2000-18311

(51) Int. Cl.$^7$ ............................................... C01G 23/07
(52) U.S. Cl. ...................................... 423/613; 106/437
(58) Field of Search ................................. 423/613, 610, 423/611, 612; 106/437

(56) References Cited

U.S. PATENT DOCUMENTS 5,922,120 A * 7/1999 Subramanian et al. ...... 106/437
5,985,020 A * 11/1999 Andes et al. ............... 106/436

* cited by examiner

*Primary Examiner*—Stanley S. Silverman
*Assistant Examiner*—Edward M. Johnson
(74) *Attorney, Agent, or Firm*—Lee & Hong

(57) ABSTRACT

A method for producing nano-sized titanium dioxide ($TiO_2$) ultrafine powder from titanium tetrachloride ($TiCl_4$) in the vapor phase by the gas phase oxidation reaction using flames, in which the method comprises: simultaneously introducing titanium tetrachloride ($TiCl_4$), vapor, argon, oxygen, hydrogen and air into a five-piped flame reactor to form a flame having a temperature of greater than 1,000° C.; and producing nano-sized titanium dioxide ultrafine powder having an average particle size of less than 50 nm.

7 Claims, 4 Drawing Sheets

METHOD FOR PRODUCING NANOMETER-SIZED ULTRAFINE TITANIUM DIOXIDE

BACKGROUND OF THE INVENTION

1. Field of the Invention

The present invention relates to a method for producing ultrafine powder, and more particularly, to a method for producing nano-sized titanium dioxide ($TiO_2$) ultrafine powder from titanium tetrachloride ($TiCl_4$) in the vapor phase by the gas phase oxidation reaction using flames.

2. Description of the Related Art

Nano-sized ultrafine powder, which refers to a powder having a particle size of less than 50 nm, is widely used as a new material due to its large specific surface area per unit weight and high activity.

For example, nano-sized titanium dioxide ultrafine powder is used as a high-quality pigment and a photocatalyst, as well as cosmetics, medicines and coating material for transparent sound proof plates.

There are two conventional methods to produce nano-sized titanium dioxide (hereinafter, referred to as "$TiO_2$") ultrafine powder: a physical method that comprises vaporizing a metal by heating and condensing the metal vapor into ultrafine powder, and a chemical method that involves the chemical reaction of metal compounds.

The physical method for producing nano-sized $TiO_2$ ultrafine powder requires great energy consumption for vaporization of the metal with the result of high production cost and low productivity but makes it possible to product high-purity powder. On the other hand, the chemical method provides low-purity powder at a low production cost with high productivity, and includes a gas phase method and a liquid phase method.

Now, a description will be given as to a method for producing nano-sized $TiO_2$ ultrafine powder by the chemical method related to the present invention.

In the preparation of nano-sized $TiO_2$ ultrafine powder by the gas phase chemical reaction method, it is necessary to provide a high temperature of at least 1000° C. and large gas flow rate. For this purpose, an approach for providing reaction conditions in the gas phase and high temperature using flames is known, wherein flame temperature, gas flow rate, concentration of reactants, and additives are critical reaction parameters that control the size and crystal form of the primary particles in the preparation of ultrafine powder.

The conventional approach for producing ultrafine powder by the gas phase chemical reaction using flames is disclosed in U.S. Pat. No. 5,698,177 under the title of "Process for producing ceramic powders, especially titanium dioxide useful as a photocatalyst" as filed on Jun. 8, 1995; and U.S. Pat. No. 5,861,132 under the title of "Vapor phase flame process for making ceramic particles using a corona discharge electric field" as filed on Sep. 4, 1997.

U.S. Pat. No. 5,698,177 suggests various methods in regard to the control of reaction parameters, the use of additives and the effect of the corona electric field formed over the burner of the reactor to produce $TiO_2$ powder for photocatalyst in the reaction system composed of $TiCl_4$, air, and hydrocarbon-based fuel gas. The claims of this patent define the preparation of $TiO_2$ powder by the gas phase reaction of $TiCl_4$ and oxygen, the flame reactor used in the preparation, how to inject the sample, the added amount of sample and air, the voltage of the electric field, and the amount of additives.

In addition, U.S. Pat. No. 5,861,132 discloses a process for producing powders of various metal oxides (e.g., silica, alumina, zirconia, etc.) including $TiO_2$ powder with various flame reactors (e.g., pre-mixed flame reactor, turbulent flame reactor, or larminar diffusion flame reactor) while providing the corona electric field over the reactor.

In the preparation of nano-sized powder using the gas phase chemical reaction, the concentration of the sample in the reaction gas has to be considerably low and an excess of gas has to be introduced into the reaction region (flame) with increasing the added amount of the reactant in order to increase the yield of the nano-sized powder per unit time.

However, the reaction system of the combustion gas composed of $TiCl_4$, air and hydrocarbon introduced into the three pipes as suggested in U.S. Pat. No. 5,698,177 has a problem that the linear velocity of the gas increases in the burner due to an excess of air to reduce the retention time of the reactant, thus resulting in existence of non-reacted materials and incomplete combustion of the fuel gas.

SUMMARY OF THE INVENTION

It is, therefore, an object of the present invention to solve the problem and to provide a method for producing nano-sized $TiO_2$ ultrafine powder from $TiCl_4$ using the reaction system of $TiCl_4$-argon-hydrogen-oxygen-air, $TiCl_4$-argon-hydrogen-air-air, or $TiCl_4$-argon-hydrogen-oxygen/air-air with a five-piped turbulent diffusion flame reactor, the method comprising: maintaining a low concentration of the sample in the reaction gas, minimizing the amount of non-reacted materials and completely combusting the fuel gas (hydrogen) to increase the yield of the nano-sized powder per unit time.

To achieve the above object of the present invention, there is provided a method for producing nano-sized $TiO_2$ ultrafine powder through oxidation with a mixed gas system passed through flames having a high temperature, the mixed gas system being composed of $TiCl_4$-argon-hydrogen-oxygen-air, $TiCl_4$-argon-hydrogen-air-air, or $TiCl_4$-argon-hydrogen-oxygen/air-air and obtained from vaporization of a liquid reactant, $TiCl_4$. In the preparation method, the $TiO_2$ ultrafine powder can have optimum particle size and crystal form by varying critical parameters such as the $TiCl_4$ content in the reaction gas, the flow rate and composition of the gas, and the like.

DETAILED DESCRIPTION OF THE PREFERRED EMBODIMENT

Hereinafter, a description will be given in detail with reference to the accompanying drawings as to a method for producing nano-sized $TiO_2$ ultrafine powder while controlling the amount of $TiCl_4$ vapor, hydrogen, oxygen, air and argon injected into the flame reactor.

Figure 1:
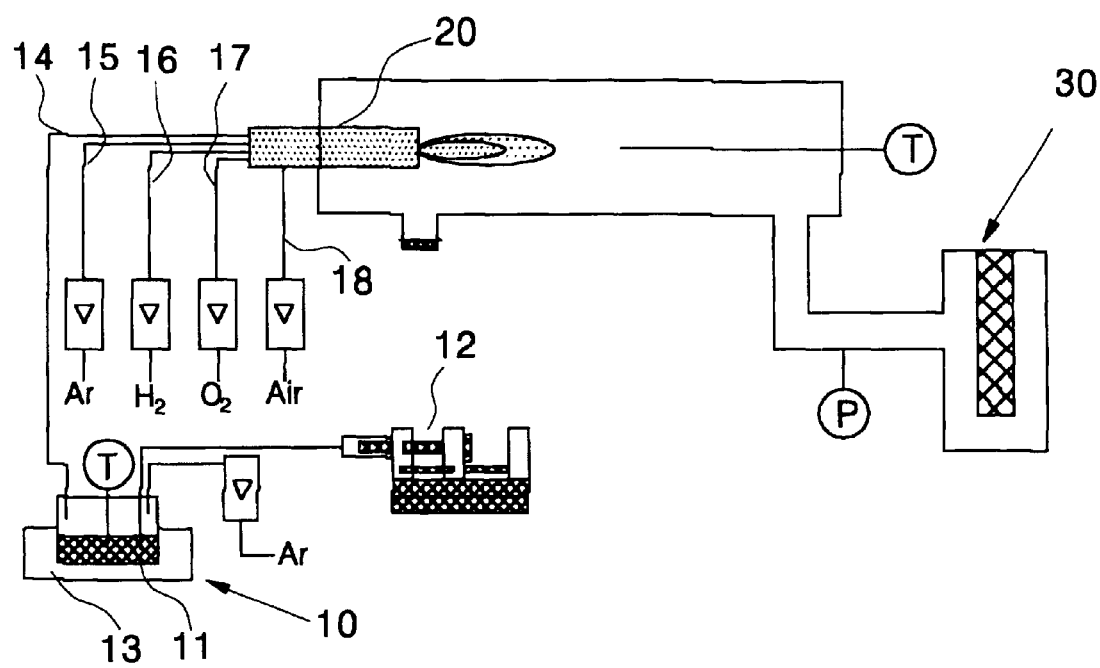
FIG. 1 is a schematic diagram of an apparatus for producing ultrafine powder as used in the present invention.

FIG. 1 is a schematic diagram of an apparatus for producing the $TiO_2$ ultrafine powder as used in the present invention, in which the apparatus includes a sample vaporizer 10 for vaporizing liquid $TiCl_4$ as a reactant, and a five-piped burner 20 for producing flames through which the $TiCl_4$ vapor is passed to form nano-sized $TiO_2$ ultrafine powder by the oxidation reaction.

EXAMPLE 1

This example is to control the particle size of the $TiO_2$ ultrafine powder produced by varying the concentration of $TiCl_4$ in the reaction gas.

$TiCl_4$ (99.9%) as a liquid sample was injected into a vaporization container 11 of the sample vaporizer 10 with a syringe pump 12 while maintaining the temperature of a vaporization tank 13 at 180° C. After vaporization of $TiCl_4$, the $TiCl_4$ vapor together with argon (Ar) as a carrier gas was injected into a first pipe 14 disposed in the center of the burner 20. Argon, hydrogen, oxygen and air were injected into the five-piped burner 20 via second to fifth pipes 15, 16, 17 and 18 at the rate as presented in Table 1 to form flames, and Reynolds numbers at each tube are also presented in Table 1.

The concentration of $TiCl_4$ in the gas injected into the burner 20 was controlled in the range of $1.13 \times 10^{-5}$ to $4.54 \times 10^{-5}$ mol/l. The flow rate of the gas injected into the five-piped burner was checked with eyes to maintain the stable flame state and controlled as presented in Table 1.

TABLE 1

| Division | Gas | Flow Rate (λ/min) | $N_{Re}$ |
|---|---|---|---|
| First Pipe | Argon and $TiCl_4$ (g) | 2 | 16,500 |
| Second Pipe | Ar | 5 | 41,200 |
| Third Pipe | Hydrogen | 6 | 5,000 |
| Fourth Pipe | Oxygen | 15 | 90,600 |
| Fifth Pipe | Air | 60 | 272,500 |

The temperature distribution of the flame thus formed was measured with a R-type thermocouple. The flame temperature was constant at about 850° C. in the center of the burner and maximum (1700° C.) at around 7 mm from the center of the burner in the radius direction.

The powder formed by changing the concentration of $TiCl_4$ in the reaction gas under the combustion conditions as shown in Table 1 was measured in regard to particle size and crystal structure. The average particle size was determined from the results of a BET analysis performed to measure the specific surface area of the particle per unit weight assuming that the particles are non-porous globular particles, according to a reduced equation ($d_p = 6/(\rho_p \cdot A)$, wherein $\rho_p$ is the density (g/cm³) of $TiO_2$; and A is the specific surface area (m²/g)).

The average particle size of the $TiO_2$ ultrafine powder was increased from 19 nm to 28 nm with an increase in the concentration of the sample.

Figure 2:
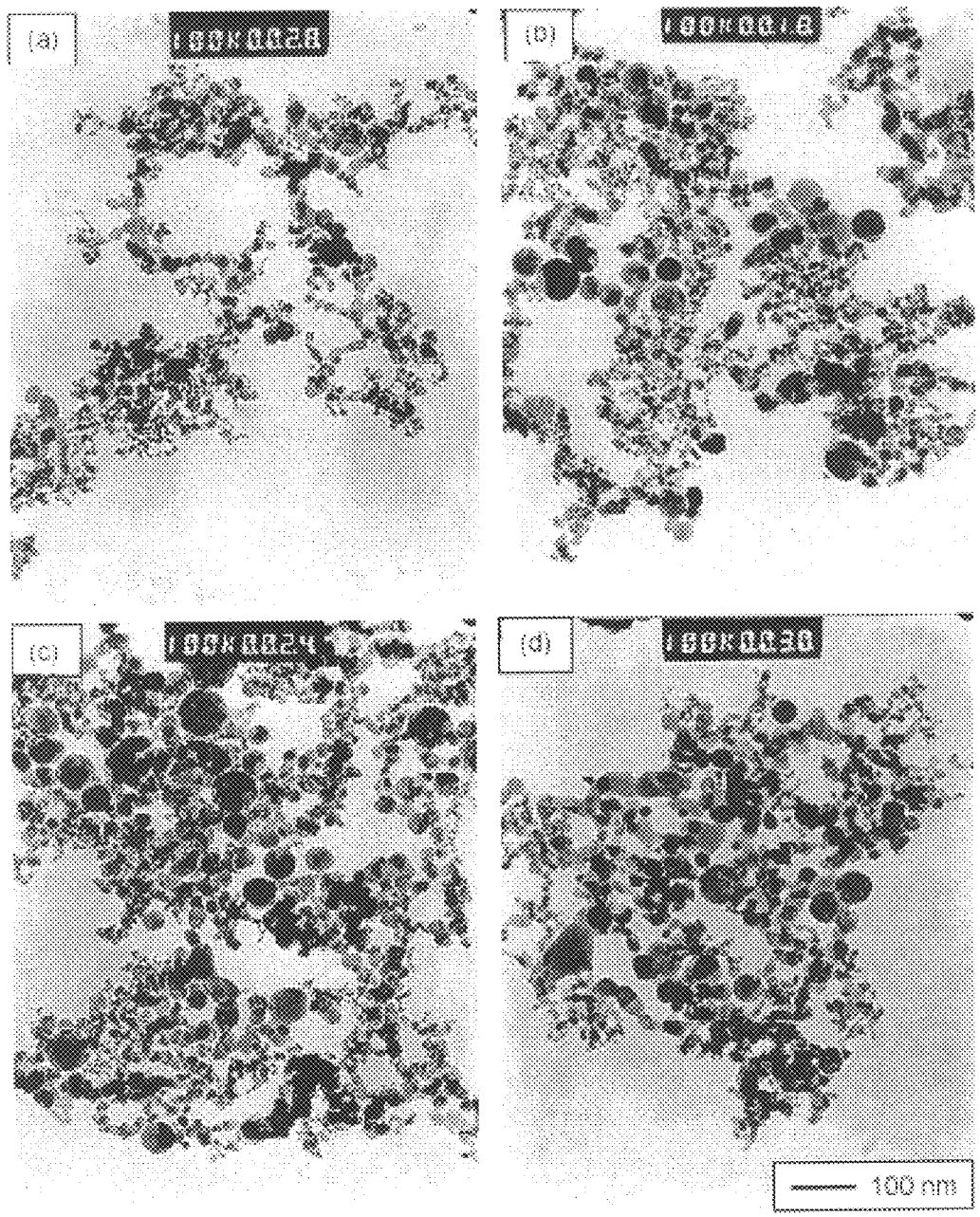
FIG. 2 is an electron micrograph of the $TiO_2$ ultrafine powder produced with various concentrations of $TiCl_4$ in the reaction gas.

FIG. 2 shows an electron micrograph of the nano-sized $TiO_2$ ultrafine powder produced by the above-described method (initial concentration of $TiCi_4$: (a) $1.13 \times 10^{-5}$ mol/l, (b) $2.27 \times 10^{-5}$ mol/l, (c) $3.45 \times 10^{-5}$ mol/l, and (d) $1.54 \times 10^{-5}$ mol/l). As apparent from the figure, the particle size was increased with an increase in the concentration of the reactant in the almost same manner as the results of the BET analysis. An XRD analysis was performed to determine the crystal form of the $TiO_2$ powder, showing that about 45% of the powder was of the anatage type under the experimental conditions of the present invention.

EXAMPLE 2

This example is to produce $TiO_2$ powder by reducing the flow rate of oxygen injected into the reactor to lower the temperature of the flame. For experimental conditions, the flow rate of oxygen injected into the fourth pipe 17 was reduced from 15 to 5 l/min from the gas injection conditions presented in Table 1. Subsequently, the flow rate of air injected into the fifth pipe 18 was increased to maintain the total flow rate constant so that the concentration of $TiCl_4$ in the reaction gas was maintained at a constant level ($2.27 \times 10^{-5}$ mol/l). The maximum temperature of the flame in this case was lowered from 1700° C. to 1400° C.

$TiO_2$ powder was produced under the experimental conditions, in which case the average particle size of the $TiO_2$ fine powder was reduced from 23 nm to 14 nm with a decrease in the flow rate of oxygen. Such a reduction of the average particle size resulted from the decreased growth rate of the particles due to agglomeration as the maximum temperature of the flame was lowered.

Figure 3:
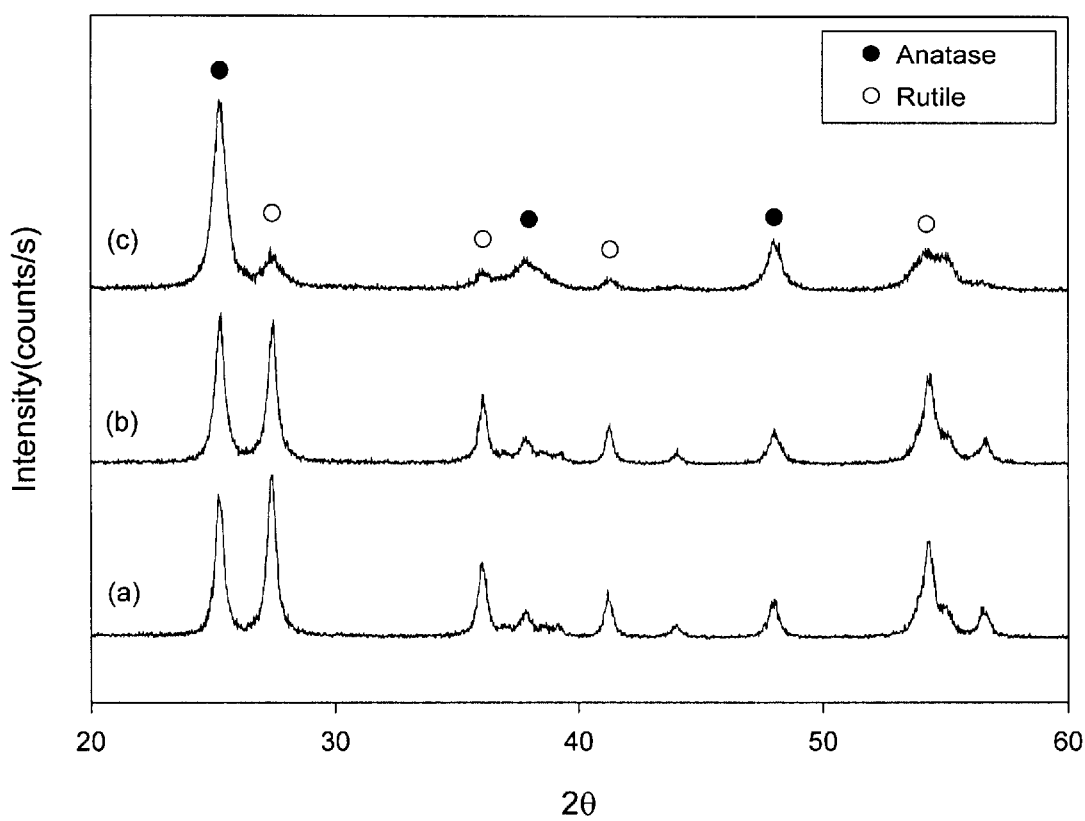
FIG. 3 is a diagram showing the analysis results for the crystal structure of the $TiO_2$ ultrafine powder produced with various flow rates of oxygen.

The analysis results for the crystal form of the $TiO_2$ powder produced by the above-described method are illustrated in FIG. 3 (the flow rate of oxygen: (a) 15 l/min, (b) 10 l/min, and 5 l/min). It is apparent from the results of FIG. 3 that the anatage content hardly changed with a decrease in the flow rate of oxygen to 10/l min but sharply increased at the flow rate of oxygen dropped to 5 l/min.

A quantitative analysis of the anatage content revealed that the anatage content was 41%, 45% and 80% with a decrease in the flow rate of oxygen.

EXAMPLE 3

This example is to analyze the particle size and the crystal form of $TiO_2$ powder produced under constant reaction conditions with various flow rates of oxygen injected into the reactor in the range from 4 to 8 l/min.

For experimental conditions, the concentration of $TiCl_4$ was maintained at a constant level of $2.27 \times 10^{-5}$ mol/l, and the amount of the gas except for hydrogen was 5 l/min at the second pipe 15 for argon (Ar), 10 l/min at the fourth pipe 17 for air, and 65 l/min at the fifth pipe 18 for air.

In this example, the gas injected into the fourth pipe 17 of the burner was air instead of oxygen in order to minimize the amount of oxygen. At this time, the temperature of the flam thus formed was measured with a change in the flow rate of hydrogen and the maximum temperature of the flame was varied from 1,300° C. to 1,000° C.

$TiO_2$ powder was produced under the conditions, in which case the average particle size of the $TiO_2$ fine powder was reduced from 29 nm to 14 nm with a decrease in the flow rate of hydrogen from 8 l/min to 4 l/min. But, the average particle size was constant when the flow rate of hydrogen was less than 5 l/min.

Figure 4:
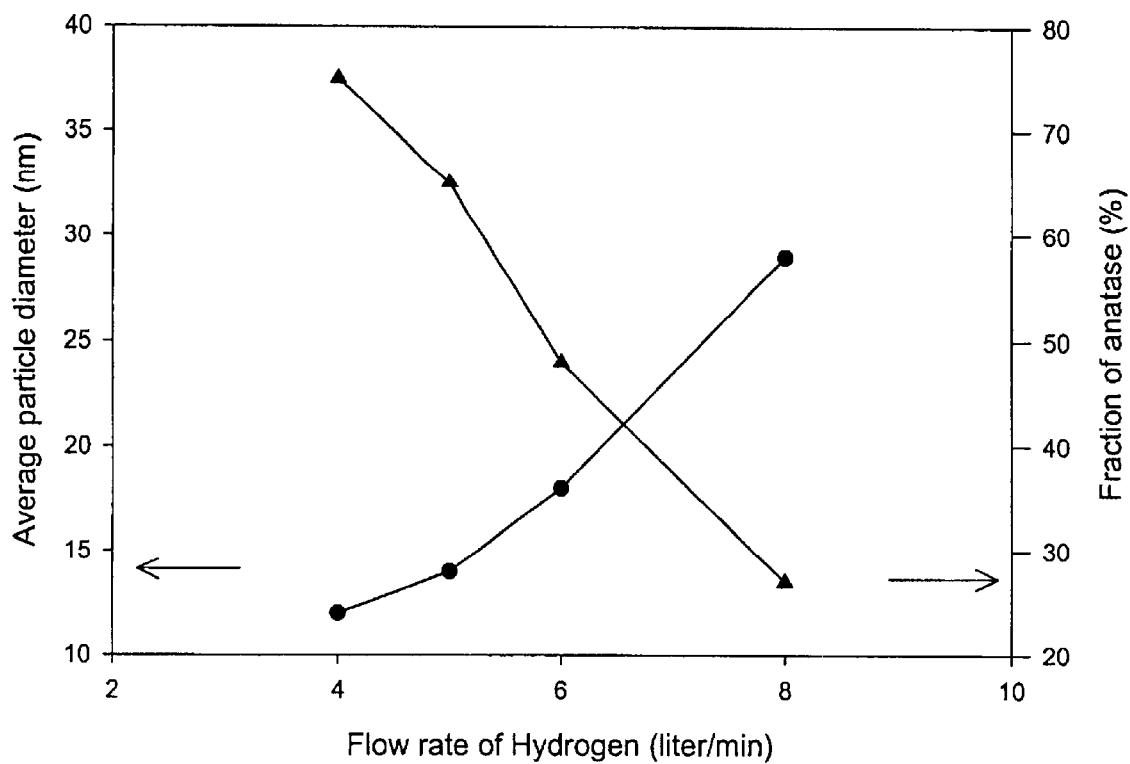
FIG. 4 is a diagram showing the change in the average particle size and the crystal form of the $TiO_2$ ultrafine powder produced with various flow rates of oxygen.

As for the crystal size of the $TiO_2$ powder, the anatage content was increased from 27% to 75% (FIG. 4) with a decrease in the flow rate of hydrogen from 8 l/min to 4 l/min.

EXAMPLE 4

This example is to produce $TiO_2$ powder by mixing air with the oxygen gas injected into the fourth pipe 17 under conditions of Example 2. As for the experimental conditions, the concentration of $TiCl_4$ and the total flow rate were maintained as described in Example 2. The flow rate of hydrogen was 5 l/min in the third pipe 15, while a mixture of oxygen having a flow rate of 4 l/min and air having a flow rate of 6 l/min was injected into the fourth pipe 17.

The $TiO_2$ powder thus obtained had an average particle size of 15 nm and an anatage content of 77%.

As described above, the present invention uses a five-piped reactor in preparation of nano-sized $TiO_2$ ultrafine powder by the gas phase chemical reaction using flames, in which the $TiO_2$ ultrafine powder is produced in the reaction system of $TiCl_4$-argon-hydrogen-oxygen-air, $TiCl_4$-argon-hydrogen-air-air, or $TiCl_4$-argon-hydrogen-oxygen/air-air, thereby providing a design data for large-scaled production.

What is claimed is:

1. A method for producing nano-sized titanium dioxide ultrafine powder using a gas phase chemical reaction, in which the gas phase chemical reaction uses flames, the method comprising:

simultaneously introducing titanium tetrachloride ($TiCl_4$), vapor, argon, oxygen, hydrogen and air into a five-piped flame reactor to form a flame having a temperature of greater than 1,000° C.; and producing nano-sized titanium dioxide ultrafine powder having an average particle size of less than 50 nm.

2. The method as claimed in claim 1, wherein the initial concentration of titanium tetrachloride vapor introduced into the flame reactor is $1.13 \times 10^{-5}$ mol/l to $4.54 \times 10^{-5}$ mol/l, and the gas introduced into the flame reactor has a composition so as to introduce the titanium tetrachloride vapor into a first pipe, the argon gas into a second pipe, the hydrogen gas into a third pipe, the oxygen gas into a fourth pipe, and air into a fifth pipe.

3. The method as claimed in claim 2, further comprising introducing a nitrogen gas of the same flow rate into the second pipe among the gas into the flame reactor.

4. The method as claimed in claim 3, further comprising: introducing a mixture of the oxygen gas (having a flow rate of 4 parts by volume based on the total flow rate) and air (having a flow rate of 7 parts by volume based on the total flow rate) into the fourth pipe, decreasing the flow rate of the hydrogen gas introduced into the third pipe to 6 parts by volume based on the total flow rate, and increasing the flow rate of air introduced into the fifth pipe as much as the decrement of the flow rate.

5. The method as claimed in claim 2, wherein the amount of the gas introduced into the respective pipes of the flame reactor is 2 parts by volume to a first pipe, 6 parts by volume to a second pipe, 7 parts by volume to a third pipe, 17 parts by volume to a fourth pipe, and 68 parts by volume to a fifth pipe based on the total flow rate.

6. The method as claimed in claim 5, further comprising changing the flow rate of the oxygen gas introduced into the fourth pipe from 17 to 6 parts by volume based on the total flow rate, and increasing the flow rate of air as much as the decrement of the flow rate.

7. The method as claimed in claim 5, further comprising: introducing the oxygen gas introduced into the fourth pipe with air of the same flow rate, decreasing the flow rate of the hydrogen gas introduced into the third pipe from 9 to 4 parts by volume based on the total flow rate, and changing the flow rate of air as much as the decrement of the flow rate.

* * * * *